Nov. 3, 1953

H. A. BABCOCK 2,657,642

PASSENGER TRANSIT SYSTEM

Filed Nov. 27, 1948

INVENTOR.
HENRY A. BABCOCK
BY
ATTORNEY

Nov. 3, 1953 H. A. BABCOCK 2,657,642
PASSENGER TRANSIT SYSTEM
Filed Nov. 27, 1948 12 Sheets-Sheet 2

INVENTOR.
HENRY A. BABCOCK
BY
ATTORNEY

Nov. 3, 1953

H. A. BABCOCK 2,657,642

PASSENGER TRANSIT SYSTEM

Filed Nov. 27, 1948

INVENTOR.
HENRY A. BABCOCK

BY
ATTORNEY

Nov. 3, 1953  H. A. BABCOCK  2,657,642
PASSENGER TRANSIT SYSTEM
Filed Nov. 27, 1948  12 Sheets-Sheet 4

INVENTOR.
HENRY A. BABCOCK
BY
ATTORNEY

Nov. 3, 1953 H. A. BABCOCK 2,657,642
PASSENGER TRANSIT SYSTEM
Filed Nov. 27, 1948 12 Sheets-Sheet 5

INVENTOR.
HENRY A. BABCOCK
BY
*C. Lamen Maltby*
ATTORNEY

Nov. 3, 1953   H. A. BABCOCK   2,657,642
PASSENGER TRANSIT SYSTEM
Filed Nov. 27, 1948   12 Sheets-Sheet 6

INVENTOR.
HENRY A. BABCOCK
BY
ATTORNEY

Nov. 3, 1953   H. A. BABCOCK   2,657,642
PASSENGER TRANSIT SYSTEM
Filed Nov. 27, 1948   12 Sheets-Sheet 7

INVENTOR.
HENRY A. BABCOCK
BY
*C. Lauren Maltby*
ATTORNEY

Nov. 3, 1953 — H. A. BABCOCK — 2,657,642
PASSENGER TRANSIT SYSTEM
Filed Nov. 27, 1948 — 12 Sheets-Sheet 8

*INVENTOR.*
HENRY A. BABCOCK
BY
ATTORNEY

Nov. 3, 1953  H. A. BABCOCK  2,657,642
PASSENGER TRANSIT SYSTEM
Filed Nov. 27, 1948  12 Sheets-Sheet 9

INVENTOR.
HENRY A. BABCOCK
BY C. Lauren Maltby
ATTORNEY

Nov. 3, 1953 H. A. BABCOCK 2,657,642
PASSENGER TRANSIT SYSTEM
Filed Nov. 27, 1948 12 Sheets-Sheet 10

INVENTOR.
HENRY A. BABCOCK
BY
ATTORNEY

Nov. 3, 1953

H. A. BABCOCK 2,657,642

PASSENGER TRANSIT SYSTEM

Filed Nov. 27, 1948

*INVENTOR.*
HENRY A. BABCOCK
BY
ATTORNEY

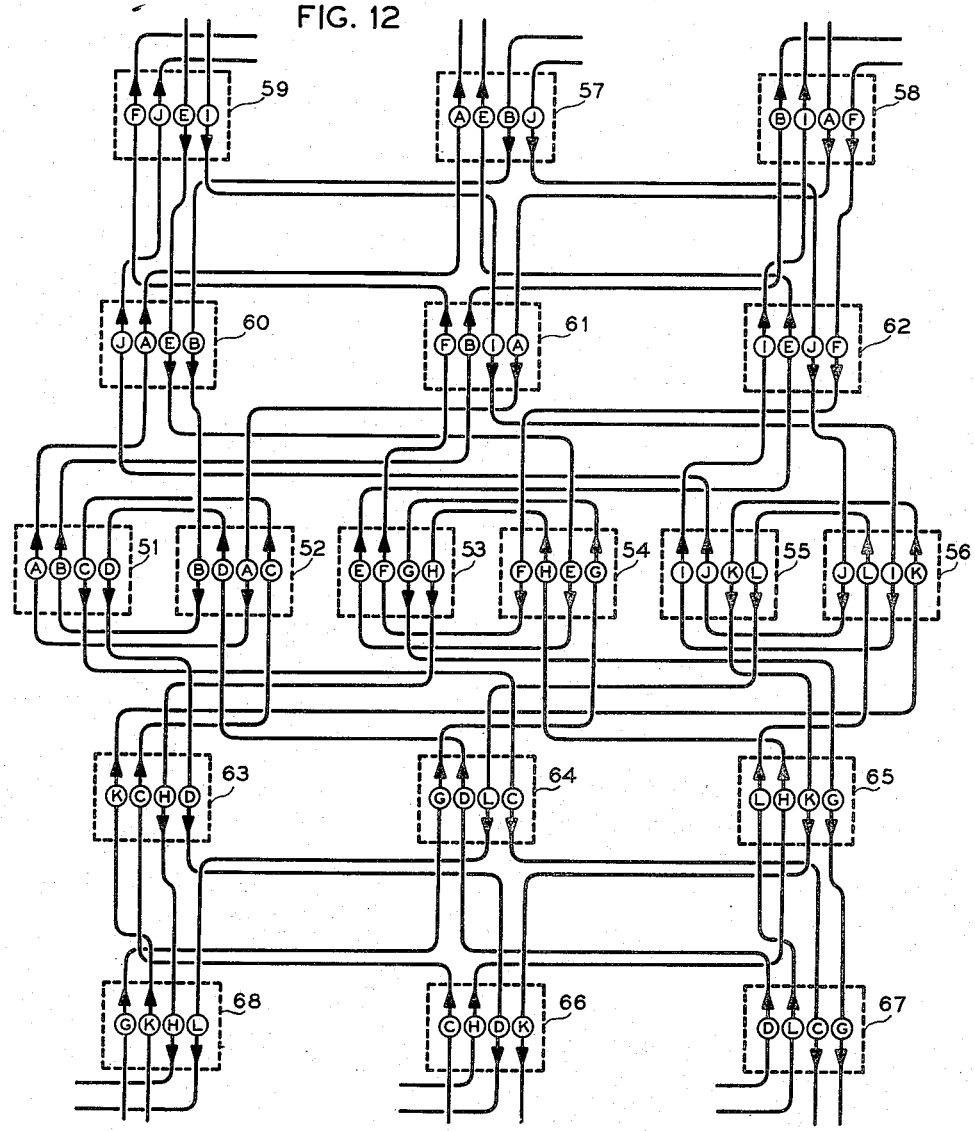

Patented Nov. 3, 1953

2,657,642

UNITED STATES PATENT OFFICE 2,657,642

PASSENGER TRANSIT SYSTEM

Henry A. Babcock, Glendale, Calif.

Application November 27, 1948, Serial No. 62,305

28 Claims. (Cl. 104—28)

This invention relates to mass-transportation and more especially to a passenger railway or transit system for urban areas.

An object of the invention is to provide a passenger transit system for cities or other urban areas that will permit travel from any point to any other point within the area serviced, in a minimum time.

Another object of the invention is to provide a rapid transit system for an urban area wherein there is a maximum access to the system from all points within the area. This access may be referred to hereinafter as 100% coverage.

Another object of the invention is to provide a novel passenger transit system that will carry passengers faster, more conveniently, more comfortably and with greater safety than is possible with any system heretofore known.

Another object of the invention is to provide a mass-transportation or transit system providing a track network having stations so disposed to permit transferring at selected stations by a synchronized movement of trains such that there will result a minimum time loss in transferring, thereby providing substantially continuous travel from any point of origin to any selected designation.

Another object of the invention is to provide a passenger transit system of the character described which is capable of extension into additional areas without adversely affecting service which has been previously provided.

Another object of the invention is to provide a passenger transit system for a city having 100% coverage throughout the area of the city, and also having novel means for transfer in a central or downtown area, permitting transfer from any incoming line to any outgoing line with a minimum of transfer movements.

Other objects and advantages will appear and be brought out more fully in the following specification, reference being had to the accompanying drawing wherein:

Fig. 12 is a diagrammatic view of a similar transfer station arrangement for twelve lines.

The general objective and purpose of this invention is to provide a comprehensive passenger transit or mass-transportation system for urban areas of considerable size by which a large number of people may be carried from any point on the system to any other point thereon rapidly, safely and economically, the system being so designed as to handle a concentration of traffic in a central or downtown area in an efficient manner and with adequate facilities for transferring from any part of the system to any other part. The system of my invention will preferably, though not necessarily, be underground for a major portion thereof, and will have stations for loading and unloading passengers at points throughout the area of coverage which will be accessible within easy walking distance, such as one-half mile of all points within the area. The system will serve extended or outside areas by suitable transferring from selected surface feeder lines such as motor buses, interurban cars, trolley coaches or street cars, reaching specific suburban territory, inasmuch as the design of my system provides for a network of lines running both into and out of a central area, as well as transverse thereto, and efficient transfer facilities are provided, and all of the trains of the system will be so coordinated or synchronized that there will be substantially no loss of time in transferring. Since the system of my invention will be underground, there will be no delays due to inteference from motor vehicle traffic, the increase of which in all metropolitan areas has slowed such traffic down to an intolerable level, escape from which is only possible by a system such as shown and described in this application.

The trains of my system will be operated at high speeds with small headways and fast acceleration, permitting the movement of a large volume of traffic even during rush hours, at which times the volume can be augmented by the addition of cars in trains which may have as many as ten cars. By my system all passengers at any station will be carried by the first train arriving thereat, and the passengers be dispersed to their points of ultimate destination by transferring to the lines reaching the respective destination stations, and there will therefore be no congestion of waiting passengers at any station.

Figure 1:
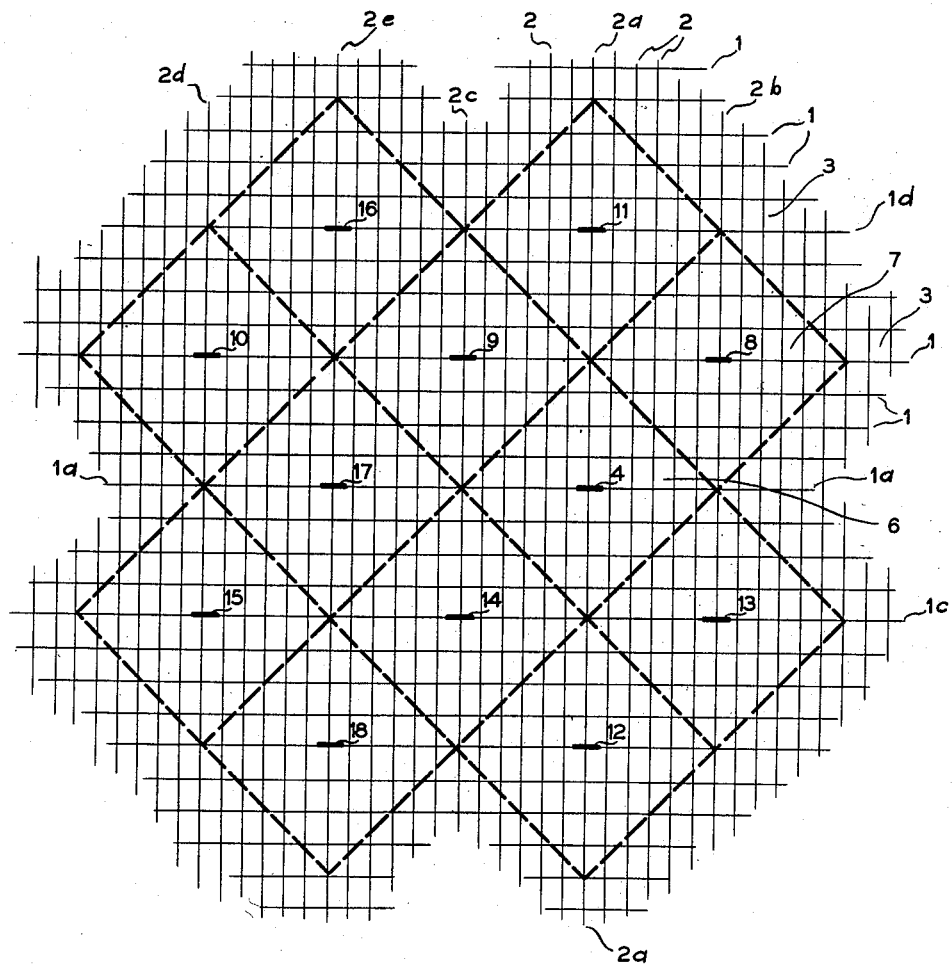
Fig. 1 is a diagrammatic view showing a portion of a city or urban area illustrating a preferred arrangement of stations of my mass-transportation system.

Referring more particularly to the drawings, and especially to Figures 1 to 4, I show in Fig. 1 a portion of an urban area comprising a plurality of intersecting streets forming blocks 3 which, for purposes of illustration, may be assumed to extend east and west, also north and south, the east and west streets being indicated by the numeral 1, and the north and south streets by numeral 2. These blocks, as shown on an enlarged scale in Fig. 2, extend eight to the mile north and south, and twelve to the mile east and west, which is a typical arrangement.

I show selected streets 1a and 2a having an intersection indicated by the numeral 4, which numeral may also refer to a station of my transit system, which may be located at this intersection.

Figure 2:
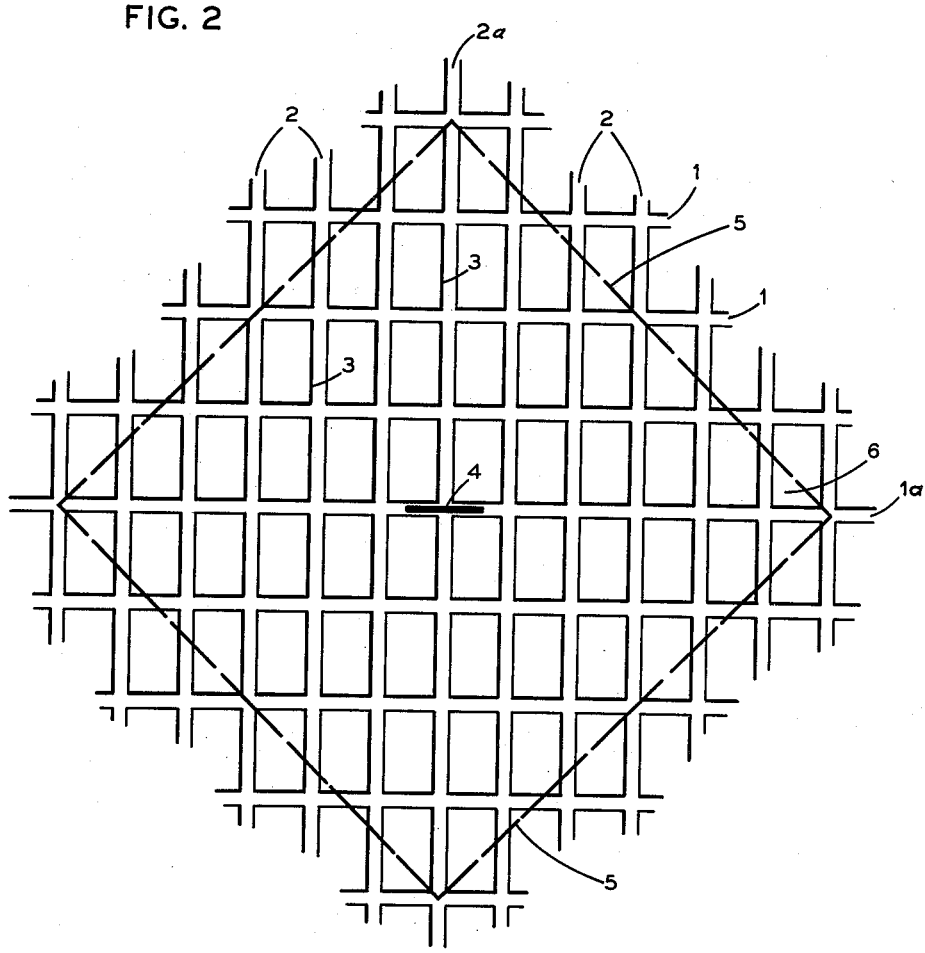
Fig. 2 is an enlarged diagrammatic view of one of the area units with its station also shown in Fig. 1.

Numeral 5, Fig. 2, indicates lines forming a square or diamond 6, any point on which line will be one-half mile from station 4 following any route along streets 1 and 2. A similar square 7, Fig. 1, may be formed adjacent square 6 forming a one-half mile locus line for a station 8 located at the intersection of streets 1b and 2b. Similar squares with central stations 9, 10, 11, 12, 13, 14, 15, 16, 17 and 18 may be located at the intersections of streets 1c, 2c, 1d, 2d and 2e, as shown in Fig. 1. It will thus be seen that stations 4 and 17 are located in a straight line on street 1a, stations 8, 9 and 10 in a straight line on street 1b, stations 13, 14 and 15 disposed similarly on street 1c, as shown in Fig. 1. It can also be seen that stations 4, 11 and 12 are arranged on a line on street 2a, stations 8 and 13 on street 2b, stations 9 and 14 on street 2c, stations 16, 17 and 18 on street 2a, and stations 10 and 15 on street 2d, as shown. It will also be apparent that these stations are spaced one mile apart east and west, and north and south.

Figure 3:
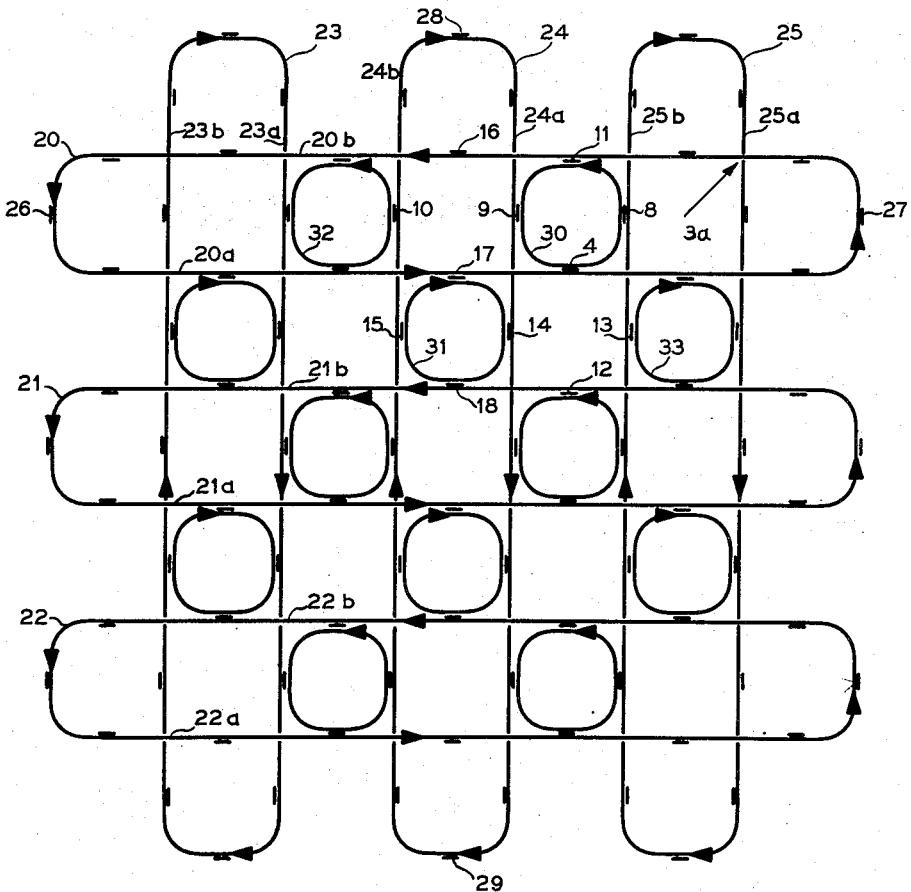
Fig. 3 is a diagrammatic view showing a track network and station arrangement of a typical portion of my novel system.
Figure 3A:
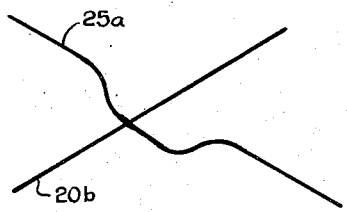
Fig. 3a is a diagrammatic view taken as indicated by the arrow 3a of Fig. 3 and showing how the tracks cross at separated levels.

In Fig. 3 I show a car track layout which comprises a series of single track loops 20, 21, 22, 23, 24 and 25 shown as crossing at separated levels, loop 20 comprising a single track 20a running along or under street 1a, and having the stations 4, 17 and other stations located on street 1a, the loop having a single track portion 20b located under street 1d which is one mile north of street 1a. The fact that the tracks cross at separated levels is best shown in Fig. 3a, wherein track portions 20b and 25a of the track loops 20 and 25, respectively, are shown crossing at separated levels, all other intersections also being at separated levels. The ends of loop 20 would be joined to comprise the loop, and the end portions may have stations such as 26 and 27, it being understood that trains on loop 20 will operate in one direction on the track thereof, such as counterclockwise as indicated by the arrows. Similarly, the ends of loop 24 are closed and include stations 28 and 29. Loop 21 similarly comprises longitudinal portions 21a and 21b, the latter including stations 12 and 18, and similarly loops 23 to 25 comprise lateral portions 22a, 22b, 23a, 23b, 24a, 24b, 25a and 25b, the stations 8, 9, 10, 11, 13, 14, 15, 16 and 17 being located on these tracks as shown.

Figure 4:
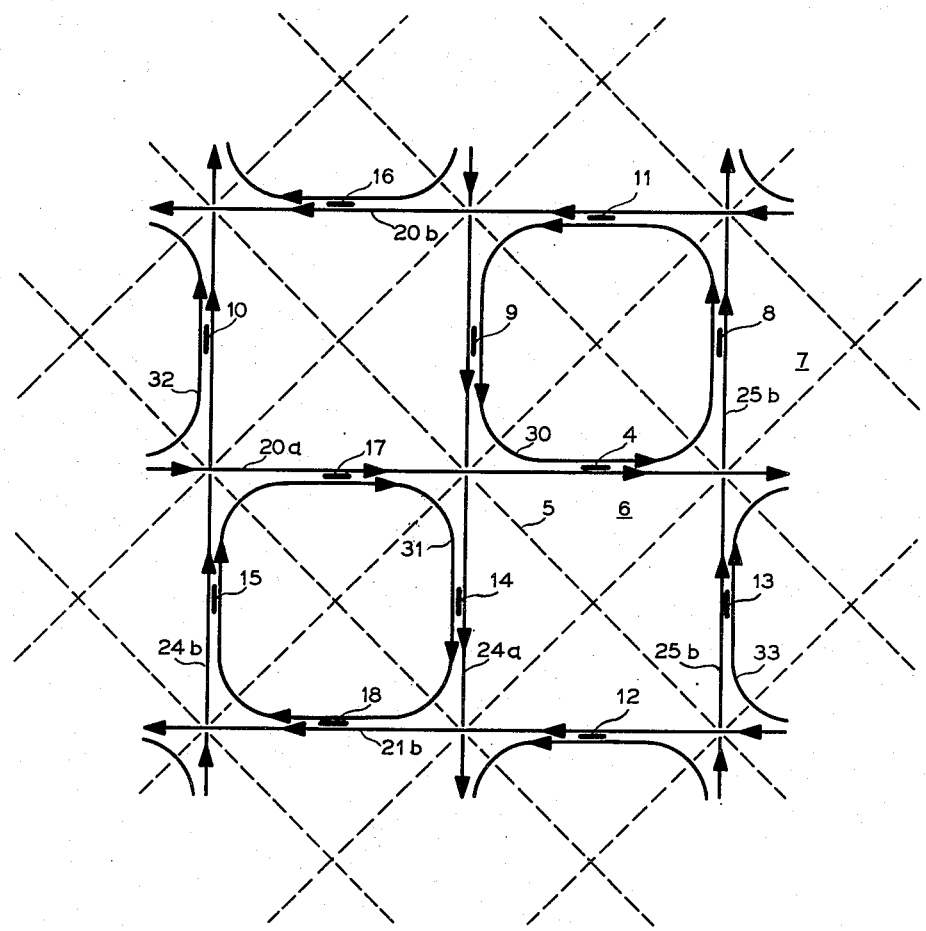
Fig. 4 is an enlarged partial view illustrating novel transfer means provided by the system of Fig. 3.

In Figs. 3 and 4 I show a plurality of circular loops 30, 31, 32 and 33, each having a single track, loops 30 connecting stations 4, 8, 11 and 9, loops 31 connecting stations 14, 17, 15 and 18, and the other loops connecting the several stations as shown. These circular loops 30 to 33 may be considered shuttle or transfer loops, and will serve to transfer passengers between the stations of loops 20, 21 and 22, which may be considered radial loops, and the stations of loops 23, 24 and 25, which may be considered lateral or crosstown loops. As will be more fully described hereinafter, the radial loops of my system will be considered to be those entering the central or downtown section of the metropolitan area, and will have special transfer station facilities.

A plurality of trains of from one to ten cars each will be operated on each of the radial and cross-town loops, the movement of the trains on the radial loops being in a counterclockwise direction and, on the cross-town loops, in a clockwise direction, and it will be observed that trains of shuttle loops 30 and 32 will operate in counterclockwise direction, and that these loops are within loop 20 but external to loops 23, 24 and 25. Loops 31 and 33 will be operated in a clockwise direction and these loops are within loops 24 and 25 but between loops 20 and 21. It will therefore be seen that stations 4, 8, 9 and 11, while being passenger loading and unloading stations for loops 20, 24 and 25, are also transfer stations between loop portions 20a, 25b, 20b and 24a, respectively. Similarly, stations 15, 17, 14 and 18 are transfer stations for loop sections 24b, 20a, 24a and 21b, as well as being loading stations. By my system it will be possible for a passenger entraining at any station to be carried to any other station of the system by one or more transfers totaling not more than four.

Figs. 5, 6, 7, 8 and 9 show diagrammatically train positions and movements during a typical cycle of operation, which cycle comprises movement of each train a total of four miles in four movements or steps of one mile each. These train movements will be coordinated or synchronized, preferably by time of departure, such that a pair of trains at each transfer station will depart at the same time by suitable electric or electronic control of the starting motors. Emergency control means will be employed in the event of a power or control failure of any one train so that such failure would not tie up more than its own unit or a loop section. Transfer from one train to another at each transfer station would be directly across a platform between the trains and therefore a minimum of walking distance would be required. The crossing of the tracks of the radial and cross-town loops will be done by separation of grades, and thus there will be no intersection interference, and it will be understood that the several trains operating on any loop will have suitable automatic block signal control.

For example, a trip from station 26, Fig. 9, to station 12 would be as follows: A passenger boards a car or train C1 which travels along portion 20a until it reaches station 34 where he transfers immediately to train C2, moving clockwise on circular loop 33, these trains being synchronized at different stations as shown in Fig. 7, and train C2 then moves to station 35 where the passenger transfers to train C3 running along portion 21b of loop 21, arriving at station 12.

Figure 5:
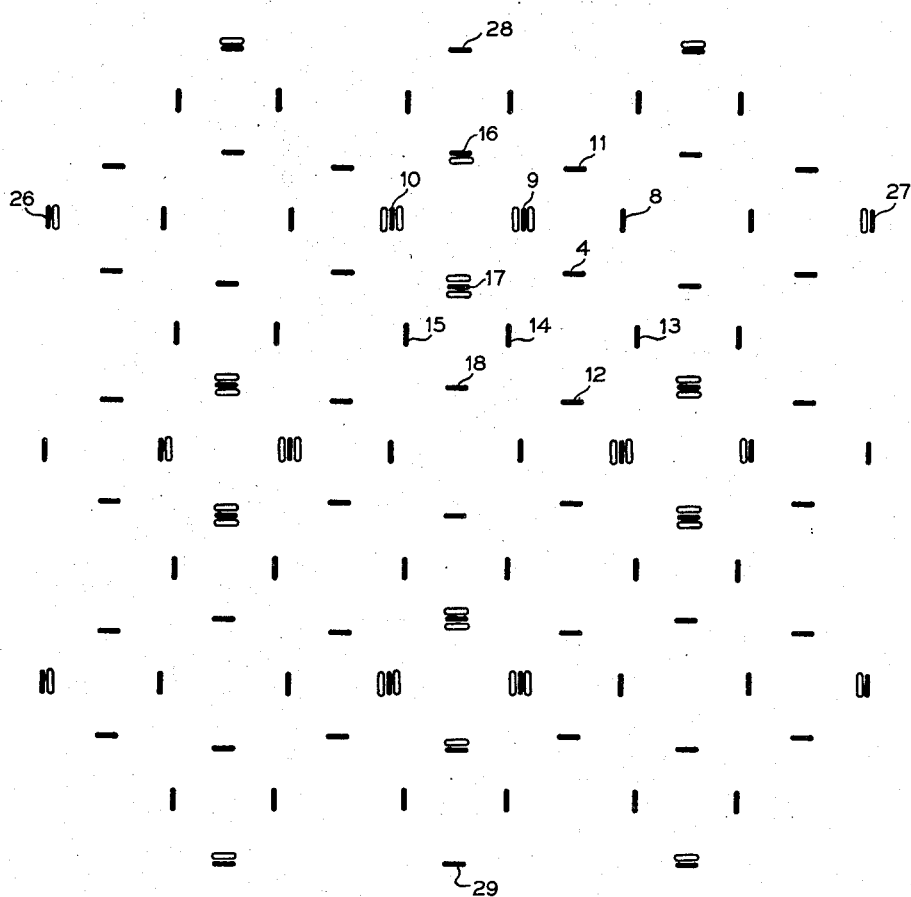
Fig. 5 is a diagrammatic view illustrating train positions at the start of a typical cycle of train movement about the system of Figs. 3 and 4.

An example of another trip such as from station 29 to station 27 would be as follows: The passenger would board train C4 running clockwise on loop 24, transferring at station 15 to train C5 on circular loop 31, and then transferring at station 17 to train C6 which synchronizes at this station with train C5 as shown in Figs. 5 and 9, the latter train carrying him to station 27. Thus passengers may board a train at any station and by suitable transfers to and from the circular and rectangular loop trains, arrive at any other station with a maximum of four transfers. The several routes between any two stations can be readily traced from the diagrammatic representation shown in Fig. 9.

Figure 6:
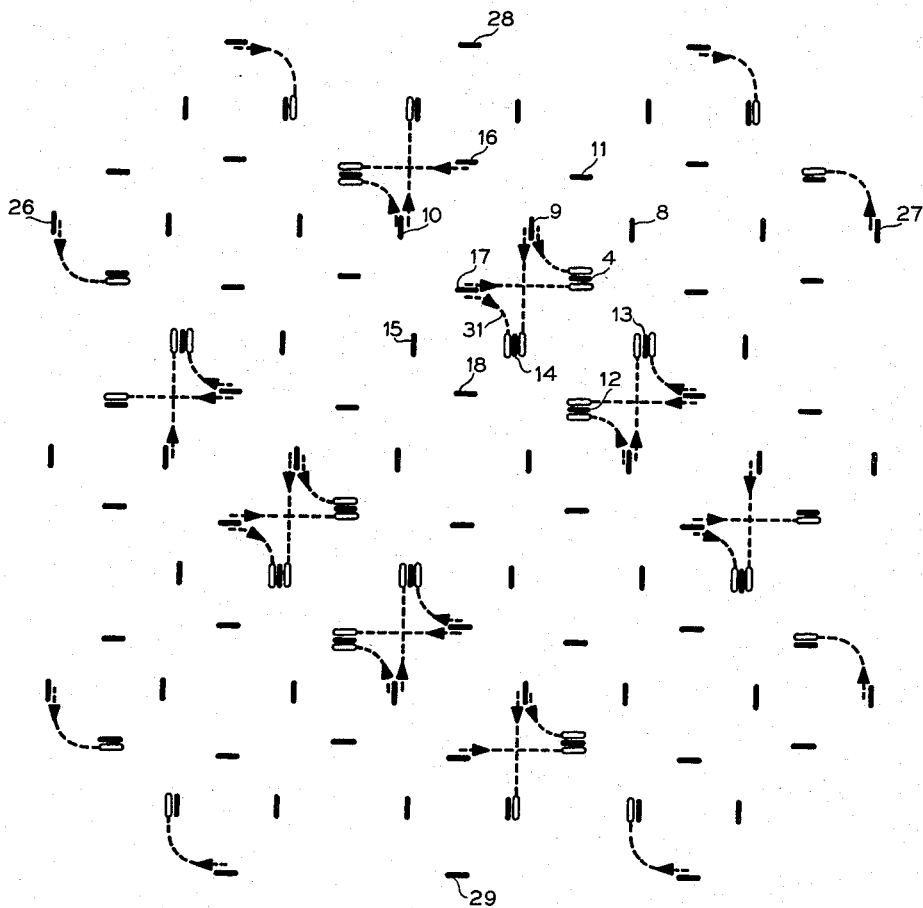
Fig. 6 is a view similar to Fig. 5 showing train movements as a first step of a synchronized cycle of operation.
Figure 7:
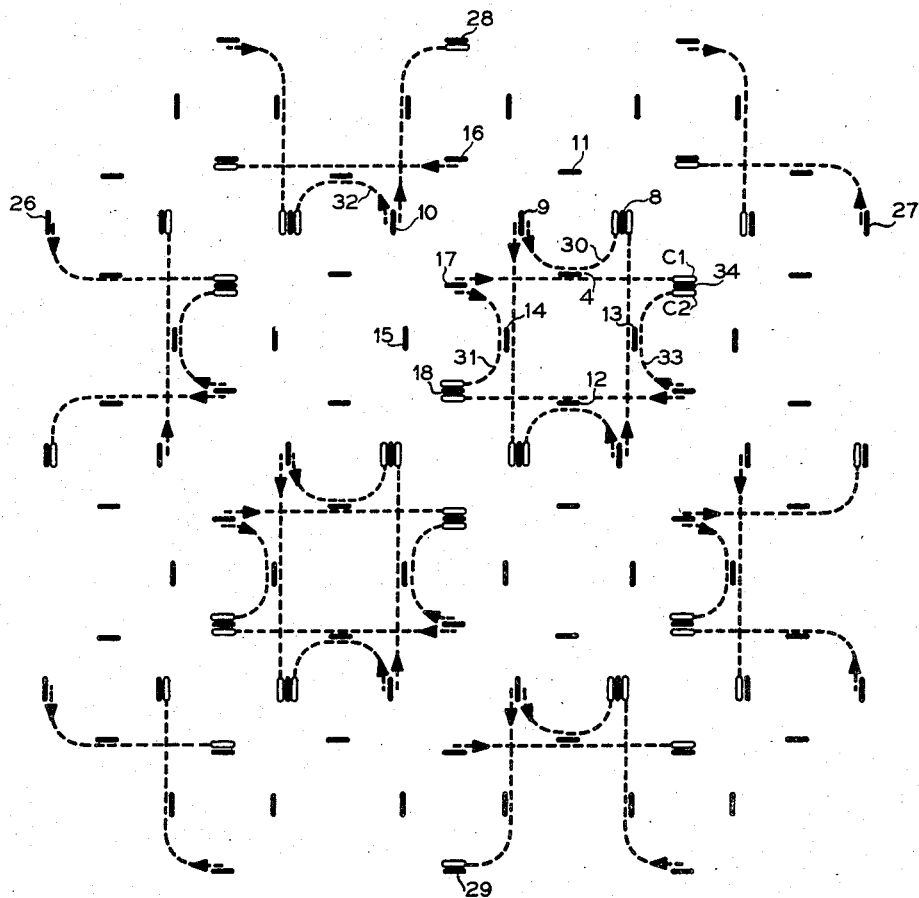
Fig. 7 is a view similar to Fig. 6 showing train positions after movement through a second step of the cycle of operation.
Figure 8:
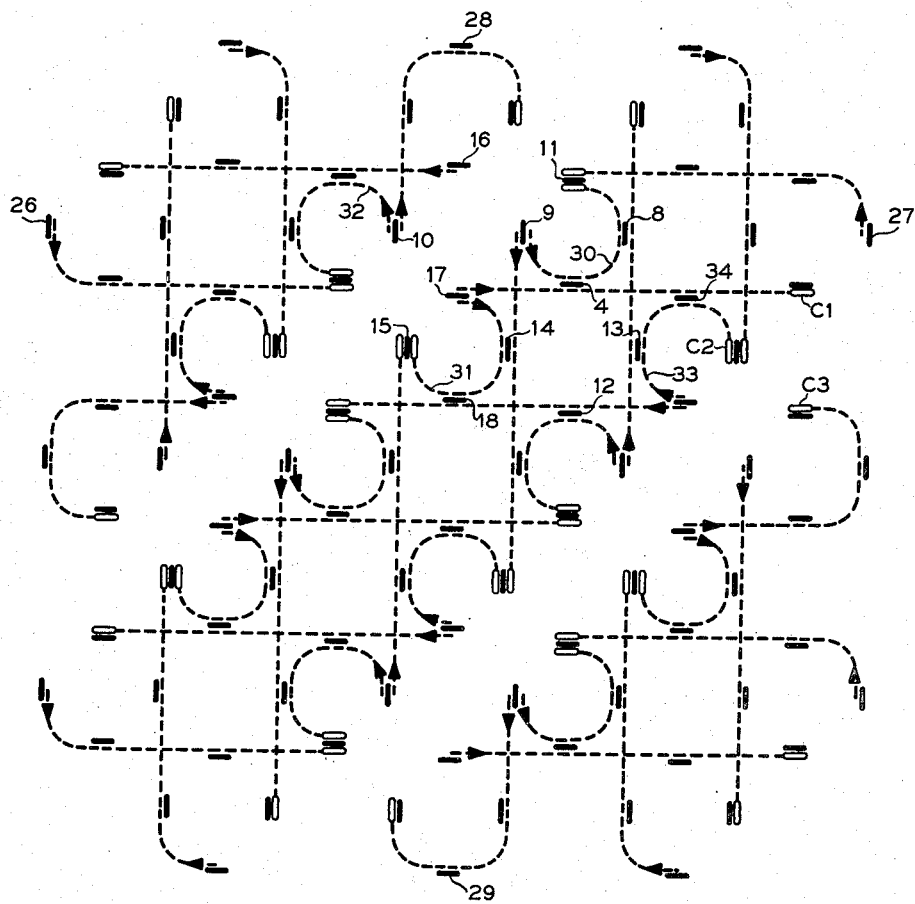
Fig. 8 is a view similar to Fig. 7 showing train positions as a third step of the cycle of operation.
Figure 9:
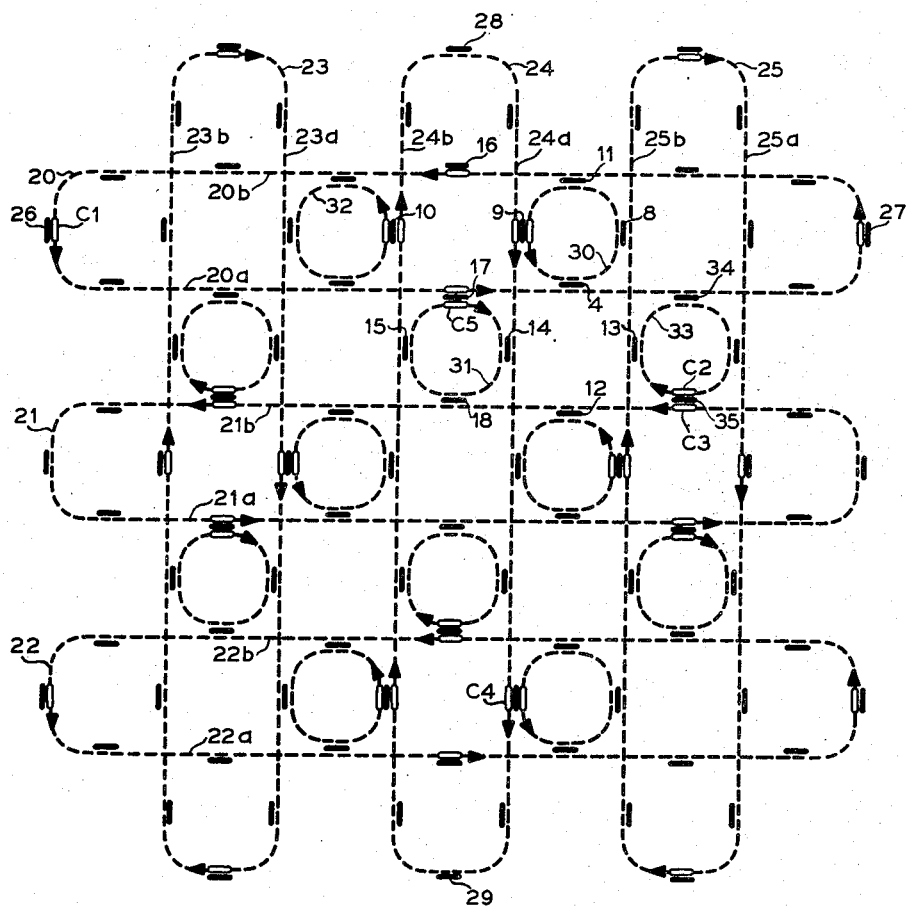
Fig. 9 is a view similar to Fig. 8 showing the positions of trains after completing a fourth step in the cycle of operation or the completion of a complete cycle of the transfer loop trains.

Fig. 5 shows the position of the trains at the beginning of a typical cycle of operation, Fig. 6 the position of the trains after a first step or movement of one mile to the next succeeding stations, Fig. 7 the positions after a second movement, Fig. 8 after a third movement, and Fig. 9 after a fourth movement which is similar to the positions of Fig. 5 except that the trains of the rectangular loops advance four stations, however the trains of the circular loops have completed a complete circle or cycle.

Figure 10:
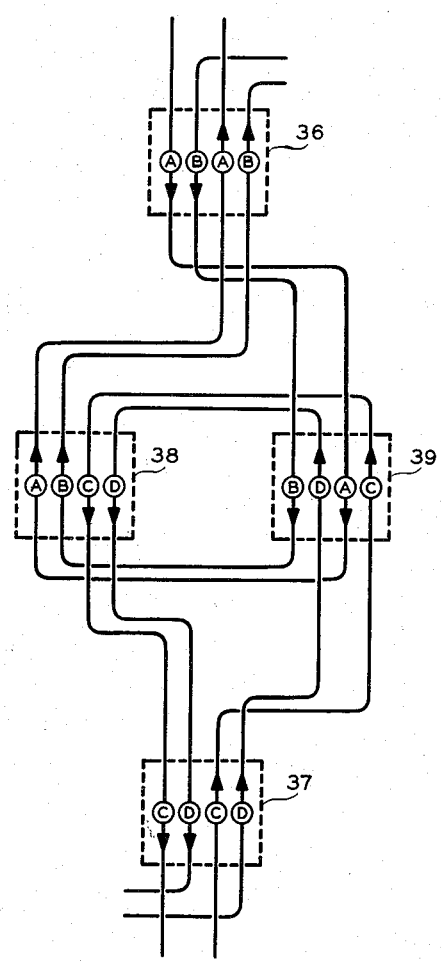
Fig. 10 is a diagrammatic view showing track pattern and transfer station arrangement for a central district illustrating transferring between four loop lines.

In Fig. 10 I show a track pattern and station arrangement for a central or business district which is entered by the end portions of a plurality of rectangular loops such as loops 20, 21, 22 and other loops which would enter such district from opposite sides or from any direction, the figure illustrating how transferring may be accomplished from trains operating on any one of the loops or lines to any of the other loops or lines, requiring only one transfer, the figure showing a total of four lines. These lines are indicated by the letters A, B, C and D, the direction of movement of the trains into and out of the stations and between the stations being indicated by the arrows on the lines which represent the single tracks of the respective lines or loops. The tracks are laid out generally and the stations are disposed generally as shown which, it will be understood, is diagrammatic rather than physical.

A three-platform transfer station 36 is the initial and final transfer station for the trains of the tracks of loops or lines A and B, and a similar station 37 is the initial and final transfer station for lines C and D. A pair of transfer stations 38 and 39 are disposed as shown, and the tracks of the several lines to and from stations 36 are arranged as shown. It will be understood that there is a platform between each pair of tracks at all of the stations, substantially at the places indicated by the letters A, B, C, etc., and that transfers may be made between the trains of the several lines by direct walk across platforms between the several tracks. Thus at station 36 transfers may be made from A to B and B to A incoming, and from B incoming to A outgoing, from A outgoing to B incoming, and from A to B or B to A outgoing.

The track from line A courses through transfer station 39 and thence through transfer station 38 and thence back through transfer station 36. Similarly, tracks of lines C and D enter the district at transfer station 37, course through stations 39 and 38 and return through station 37. It will be observed that at stations 36 and 38 tracks A and B are adjacent and that the trains move in the same directions. It will also be noticed that at station 39 track A is between tracks C and D, and that track D is between tracks A and B, and that the trains of tracks A and B move in opposite directions to those of trains C and D. For example, a passenger coming in on either line A or B wishing to transfer to line D, may do so at station 39. A passenger coming in on line A wishing to transfer to line C, may do so at station 39, however, a passenger coming in on line B wishing to transfer to line C, may do so at station 38. Similar transfers may be made from either of lines C or D to either lines A or B at station 39 or at station 38.

It will, therefore, be seen that loading may be done at any station for a trip out on any line or to any other station requiring at most only one transfer. It will also be understood that trains will be synchronized at the stations in the same manner as at the stations of the radial and cross-town loop transfer stations 4, 8, 9, 10, 14, 15, 16, etc. as described hereinabove.

Figure 11:
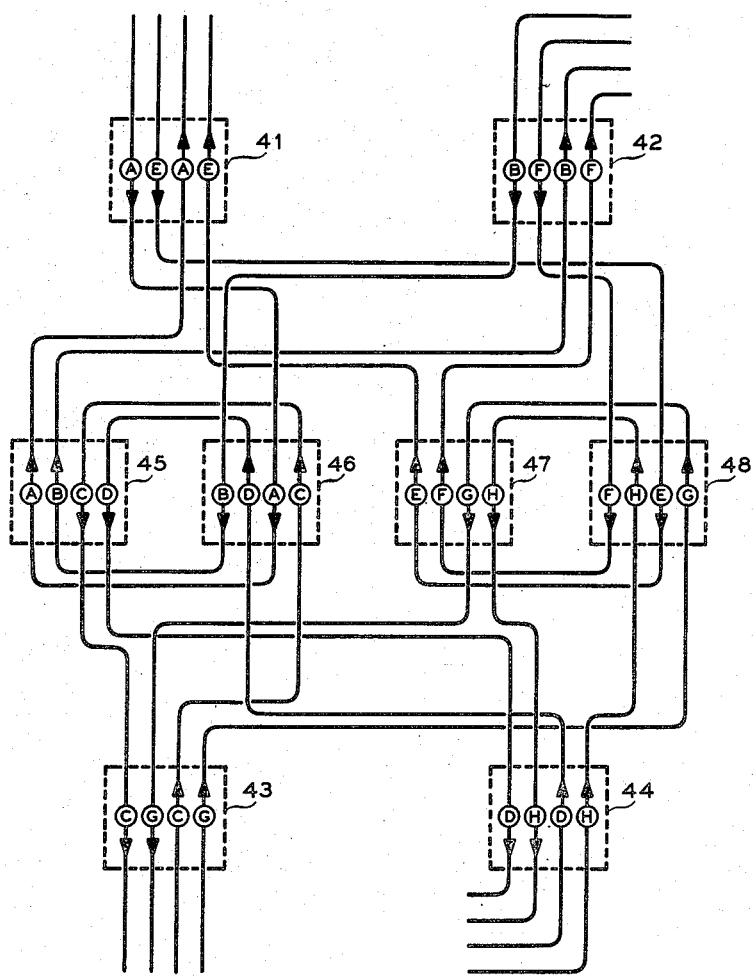
Fig. 11 is a diagrammatic view of a similar transfer station arrangement for eight lines.

In Fig. 11 I show a track pattern and station arrangement for a central business district served by the end portions of eight rectangular loop lines. In this figure I show transfer stations 41, 42, 43 and 44 which are the incoming and outgoing transfer stations for lines which are designated A, B, C, etc. including H. I also show transfer stations 45, 46, 47 and 48 through which the tracks of the several loop lines course as shown.

By this arrangement transfer may be made by a maximum of two transfers from any line to any other line and from any station to any other station. It will be observed that stations 45 and 46 are served by lines A, B, C and D only, but that at one or the other of these stations transfers may be made from any line to any other line of this group. Similarly, stations 47 and 48 are served by lines E, F, G and H, and that by a single transfer transfers may be made between any two lines of this group. It will also be clear that at stations 41, 42, 43 and 44 transfers may be made from each of the lines of the A, B, C, D group to one of the lines of the E, F, G, H group.

As an example, a passenger coming in on line A, desiring to transfer to line F, will transfer to line E at station 41 and to line F at station 47.

A passenger coming in on line H, desiring to go out on line C, will transfer to line D at station 44 and then transfer to line C at station 45. A passenger entering station 43, desiring to go to station 42, will board a train on loop track G and transfer to line F at station 47 which takes him to station 42. Thus a universal station and line transferring can be accomplished by a maximum of two transfers throughout this eight-line system.

In Fig. 12 I show a track pattern and station arrangement for a central district which is entered by end portions of twelve loop lines. The lines of this group are designated A, B, C, etc., including L. In this figure I show three-platform, four-track primary stations 51, 52, 53, 54, 55 and 56, stations 51 and 52 serving to transfer universally between and among lines A, B, C and D. Similarly, stations 53 and 54 are universal transfer stations between and among E, F, G and H, and stations 55 and 56 are universal transfer stations for lines I, J, K and L.

I show twelve secondary transfer stations designated 57, 58, 59, 60, 61, 62, 63, 64, 65, 66, 67 and 68. It will be seen that stations 57, 58, 59, 66, 67, and 68 are the entering and departure stations of each loop line with respect to the central transfer district, and that stations 60, 61, 62, 63, 64 and 65 are intermediate the last mentioned stations, and the primary transfer stations 51, 52, 53, 54, 55 and 56. By this track and station arrangement trips may be made between any two stations, and transfers may be made between any two lines involving only a single transfer movement.

As an example, a passenger coming in on line A can transfer at either station 51 or 52 to either of lines B, C or D. If the passenger desires to transfer to either of lines E, F, G or H he may transfer directly to line F at station 58, and may transfer to either of lines E, G or H at station 53 or 54 through which line F passes. If this passenger should desire to transfer to either of lines I, J, K or L he may transfer to I direct at station 61 or continue on line I to station 55 or 56.

An example of a typical station to station trip would be as follows: Assume a passenger enters station 63 and desires to go to station 59. He may do so by boarding a train on line K which will take him to station 55 where he transfers to line J which takes him to station 59. Other trips and transfers may be readily traced. The train movements and transfers of this network will be synchronized at all stations except that there will not be synchronization at stations 57, 58, 59, 66, 67 and 68 between the trains of the two inner tracks such as B and E at station 51, and A and I at station 58.

It will be understood that the foregoing description is illustrative rather than restrictive of my invention, and that changes and modifications may be made without departing from the spirit and scope of the sub-joined claims. For example, the locations of the rectangular loop and transfer stations may be at the intersections of the respective loop tracks rather than intermediate these intersections, and it may be desirable to curve the pairs of tracks somewhat so that direct transfer may be made between pairs of the rectangular loops. Also, it will be understood that switching will be provided at selected points to bring cars on and off the loop tracks to adapt to load conditions. Furthermore, certain of such switching will be provided so that in the event of a breakdown or car failure at any point on any loop, that particular track section may be isolated so as not to affect operation of the remainder of the loop. For instance, if a breakdown or failure should occur on loop section 20b at station 16, trains on this loop could be switched at station 11 to circular loop 30, and at station 9 to loop section 24a and thence to circular loop 31 at station 14, thence to loop section 24b at station 15 thence to circular loop 32 at station 10 and back to loop section 21b at the transfer station between loop 32 and track section 20b.

Having described my invention what I claim is:

1. A mass transportation system for an area capable of subdivision into units arranged in ranks and files, comprising a plurality of single track loops traversing the units of pairs of ranks, a plurality of single track loops traversing the units of pairs of files, a plurality of single track shuttle loops in selected polygons formed by said track loops, said shuttle loops having portions tangent to the track loops forming said polygons, and transfer stations at the respective points of tangency.

2. A mass transportation system for an area capable of subdivision into units arranged in ranks and files, comprising a plurality of single track loops traversing the units of pairs of ranks, a plurality of single track loops traversing the units of pairs of files, a plurality of single track shuttle loops in selected polygons formed by said track loops, said shuttle loops having portions tangent to the track loops forming said polygons, and transfer stations at the respective points of tangency, said transfer stations being disposed intermediate the points of crossing of said track loops.

3. A mass transportation system for an area capable of subdivision into units arranged in ranks and files, comprising a plurality of single track loops traversing the units of pairs of ranks, a plurality of single track loops traversing the units of pairs of files, a plurality of single track shuttle loops in selected polygons formed by said track loops, said shuttle loops having portions tangent to the track loops forming said polygons, and transfer stations at the respective points of tangency, said transfer stations being disposed adjacent the points of crossing of said track loops.

4. A mass transportation system for an area capable of subdivision into units arranged in ranks and files, comprising a plurality of single track loops traversing the units of pairs of ranks, a plurality of single track loops traversing the units of pairs of files, a plurality of single track shuttle loops in selected polygons formed by said track loops, said shuttle loops having portions tangent to the track loops forming said polygons, and transfer stations at the respective points of tangency, said transfer stations being disposed intermediate the points of crossing of said track loops, the track loops of said ranks and files being arranged to cross at separated levels.

5. A mass transportation system for an area capable of subdivision into units arranged in ranks and files, comprising a plurality of single track loops traversing the units of pairs of ranks, a plurality of single track loops traversing the units of pairs of files, a plurality of single track shuttle loops in selected polygons formed by said track loops, said shuttle loops having portions tangent to the track loops forming said polygons, and transfer stations at the respective points of tangency, said transfer stations being disposed intermediate the points of crossing of said track loops, and trains adapted to be operated on said loops.

6. A mass transportation system for an area capable of subdivision into units arranged in ranks and files, comprising a plurality of single track loops traversing the units of pairs of ranks, a plurality of single track loops traversing the units of pairs of files, a plurality of single track shuttle loops in selected polygons formed by said track loops, said shuttle loops having portions tangent to the track loops forming said polygons, and transfer stations at the respective points of tangency, said transfer stations being disposed intermediate the points of crossing of said track loops, a plurality of trains adapted to be operated on said rank and file loops, and at least one train on said shuttle loops.

7. A mass transportation system for an area capable of subdivision into units of substantially equal size arranged in ranks and files, comprising a plurality of single track loops traversing the units of pairs of ranks, a plurality of single track loops traversing the units of pairs of files, a plurality of single track shuttle loops in selected polygons formed by said track loops, said shuttle loops having portions tangent to the track loops forming said polygons, and transfer stations at the respective points of tangency.

8. A mass transportation system for an area capable of subdivision into contiguous units of substantially equal size arranged in ranks and files, comprising a plurality of single track loops traversing the units of pairs of ranks, a plurality of single track loops traversing the units of pairs of files, a plurality of single track shuttle loops in selected polygons formed by said track loops, said shuttle loops having portions tangent to the track loops forming said polygons, and transfer stations at the respective points of tangency.

9. A mass transportation system for an area capable of subdivision into units arranged in ranks and files, comprising a plurality of single track loops traversing the units of pairs of ranks, a plurality of single track loops traversing the units of pairs of files, a plurality of single track shuttle loops in selected polygons formed by said track loops, said shuttle loops having portions tangent to the track loops forming said polygons, and transfer stations at the respective points of tangency, said transfer stations being disposed intermediate the points of crossing of said track loops, and trains adapted to be operated on said loops, the trains of adjacent ranks and the trains of adjacent files being operated in opposite directions.

10. A mass transportation system for an area capable of subdivision into units arranged in ranks and files, comprising a plurality of single track loops traversing the units of pairs of ranks, a plurality of single track loops traversing the units of pairs of files, a plurality of single track shuttle loops in selected polygons formed by said track loops, said shuttle loops having portions tangent to the track loops forming said polygons, and transfer stations at the respective points of tangency, said transfer stations being disposed intermediate the points of crossing of said track loops, and trains adapted to be operated on said loops, the trains of adjacent ranks and the trains of adjacent files being operated in opposite directions, the trains of the shuttle loops being operated in a direction to correspond to the direction of the trains of the adjacent rank and file loop tracks.

11. A mass transportation system for an area capable of subdivision into units arranged in ranks and files, comprising a plurality of single track loops traversing the units of pairs of ranks, a plurality of single track loops traversing the units of pairs of files, a plurality of single track shuttle loops in selected polygons formed by said track loops, said shuttle loops having portions tangent to the track loops forming said polygons, and transfer stations at the respective points of tangency, and a loading station for at least one of said track loops at substantially the center of each unit of said area.

12. A mass transportation system having a plurality of single track radial loops, a plurality of transfer stations for the adjacent end portions of said loops, each of said loops entering a plurality, less than the aggregate number, of said stations whereby transfers may be made from any loop to any other loop by not more than two transfer movements.

13. A mass transportation system having a plurality of single track radial loops, a plurality of transfer stations for the adjacent end portions of said loops, said stations each having at least four tracks and a transfer platform between each pair of tracks, the tracks of each of said loops entering a plurality of said stations whereby transfers may be made from any loop to any other loop by not more than two transfer movements.

14. A mass transportation system having a plurality of single track radial loops, a plurality of transfer stations for the adjacent end portions of said loops equal in number to the number of said loops, the tracks of each loop entering a plurality of said stations, less than the number of said stations whereby transfers may be made from any loop to any other loop by not more than two transfers.

15. A mass transportation system having a plurality of single track radial loops, a plurality of transfer stations for the adjacent end portions of said loops equal in number to the number of said loops, the tracks of each loop entering a plurality of said stations, less than the number of said stations whereby transfers may be made from any loop to any other loop by not more than one transfer.

16. A mass transportation system having a plurality of single track radial loops, a plurality of transfer stations for the adjacent end portions of said loops equal in number to the number of said loops, the tracks of each loop entering a plurality of said stations, less than the number of said stations whereby a trip may be made between any two stations requiring not more than two transfers.

17. A mass transportation system having a plurality of single track radial loops, a plurality of transfer stations for the adjacent end portions of said loops equal in number to the number of said loops, the tracks of each loop entering a plurality of said stations, less than the number of said stations whereby a trip may be made between any two stations requiring not more than one transfer.

18. A mass transportation system having a plurality of single track radial loops, a plurality of transfer stations for the adjacent end portions of said loops equal in number to the number of said loops, one half of said stations being inner stations and one half being outer stations, the tracks of said loops each entering and leaving one of said outer stations and traversing a pair of said inner stations whereby transfers may be made from any loop to any other loop by not more than two transfers.

19. A mass transportation system having a plurality of single track radial loops, a plurality of transfer stations for the adjacent end portions of said loops equal in number to the number of said loops, one half of said stations being inner stations and one half being outer stations, the tracks of said loops each entering and leaving one of said outer stations and traversing a pair of said inner stations whereby transfers may be made from any loop to any other loop by not more than one transfer.

20. A mass transportation system having twelve single track radial loops, a plurality of transfer stations for the adjacent end portions of said loops, said stations each having four tracks and three platforms therebetween, there being three pairs of primary stations, the loop tracks of the respective groups being different, the tracks of each pair being arranged in differing order whereby transfers may be made at said primary stations in one transfer from any loop to any other loop, twelve secondary stations arranged six inbound and six outbound with respect to said primary stations, and said secondary station tracks being arranged to effect transfers in one transfer from a loop of one group to a loop of each of the other two groups before reaching and after leaving its respective primary stations.

21. In a transportation system, the combination of: a plurality of transfer stations; and a plurality of independent routes each of which traverses a number of said transfer stations less than the total number thereof, each of said transfer stations being traversed by at least two adjacent routes in generally parallel but laterally spaced relation and in the same direction.

22. A transportation system as defined in claim 21 wherein at least one of said transfer stations is traversed by two of said routes in one direction and by two of said routes in the opposite direction.

23. A transportation system according to claim 21 wherein each of said routes, in traversing at least one of said stations, is disposed between two others of said routes.

24. A transportation system as defined in claim 21 wherein each of said routes includes inbound and outbound sections and wherein each of said transfer stations is traversed by at least two inbound and at least two outbound sections in opposite directions.

25. In a mass transportation system, the combination of: a plurality of primary route loops for public carriers, said primary route loops extending in generally the same direction and being spaced apart; a plurality of secondary route loops for public carriers, said secondary route loops being spaced apart and extending generally in the same direction, said secondary route loops crossing said primary route loops; and a plurality of shuttle route loops respectively disposed in selected polygons formed by said primary and secondary route loops, said shuttle route loops having portions tangent to the respective primary and secondary route loops forming said polygons.

26. A mass transportation system according to claim 25 including transfer stations at the respective points of tangency, each of said transfer stations being disposed between the two route loops at the corresponding point of tangency.

27. A mass transportation system according to claim 25 wherein the two route loops at each point of tangency extend in the same direction.

28. In a transportation system, the combination of: a plurality of transfer stations; and a plurality of independent routes each of which traverses a number of said transfer stations less than the total number thereof, each of said transfer stations being traversed by at least two of said routes in generally parallel but laterally spaced relation, at least one of said routes comprising a shuttle loop traversing four of said transfer stations.

HENRY A. BABCOCK.

References Cited in the file of this patent

UNITED STATES PATENTS

| Number | Name | Date |
|---|---|---|
| 645,278 | Trebbin | Mar. 13, 1900 |
| 975,103 | Ziron | Nov. 8, 1910 |
| 1,076,355 | Drum | Oct. 21, 1913 |
| 1,084,849 | Drum | Jan. 20, 1914 |
| 1,303,835 | Weber | May 13, 1919 |
| 1,381,317 | Loughridge | June 14, 1921 |
| 2,320,150 | Loughridge | May 25, 1943 |

OTHER REFERENCES

Guide Map of the Capital Transit Co. of Washington, D. C., dated November 17, 1946.